United States Patent Office 2,904,528
Patented Sept. 15, 1959

2,904,528
COMPOSITION COMPRISING EPOXIDE RESIN AND TRIFLUOROCHLOROOLEFIN COPOLYMER AND PROCESS OF CROSSLINKING SAME

Francis J. Honn, Westfield, N.J., assignor, by mesne assignments, to Minnesota Mining and Manufacturing Company, St. Paul, Minn., a corporation of Delaware No Drawing. Application December 30, 1954
Serial No. 478,929

12 Claims. (Cl. 260—45.5)

This invention relates to perfluorochloroolefinic polymers and more particularly to mixtures of perfluorochloroolefinic polymers with epoxide resins.

Due to their unusual properties, the perfluorochloroolefinic polymers have been widely used in applications where their properties are best exploited. Their excellent physical properties have led to their use as electrical insulators, particularly under conditions where high temperatures were encountered. Because of their excellent chemical properties these polymers are frequently employed as protective coatings against the effects of adverse environmental conditions, for example, exposure to strong oxidizing agents such as fuming nitric acid, sulfuric acid, etc. An excellent degree of chemical resistance is attained by the use of normally solid homopolymers of the perfluorochloroolefins, such as the homopolymer of trifluorochloroethylene. Frequently, however, copolymers of the perfluorochloroolefins with other halogenated olefins, particularly fluoroolefins, are employed where properties not attainable by the use of the homopolymer are desired. For example, trifluorochloroethylene can be copolymerized with vinylidene fluoride so as to produce copolymers ranging in properties from relatively hard resins to elastomers. In this connection, copolymers of trifluorochloroethylene and vinylidene fluoride containing above 69 mole percent and not higher than about 80 mole percent of trifluorochloroethylene are relatively hard, resinous materials, whereas copolymers containing between about 20 and about 69 mole percent of trifluorochloroethylene are elastomeric. The copolymers described above, unlike the homopolymer, are soluble in a variety of relatively common solvents at room temperature and hence can be applied as coatings by spray, brush, dip and other standard techniques. These desirable properties are attained in the copolymer with a negligible reduction in resistance to corrosive chemicals.

Frequently in employing copolymers of the perfluorochloroolefins copolymerized with other halogenated olefins, it is desirable to modify the physical characteristics of the copolymer. Thus, in certain instances it is of advantage to improve the hardness of copolymer coatings, whereas in other instances particularly where difficulty bondable sub-strates are to be coated, the adhesion of the copolymer can be improved.

It is an object of this invention to provide additives for modifying the physical properties of copolymers of the perfluorochloroolefins.

It is another object of this invention to provide a compatible resin which can be blended with the perfluorochloroolefin copolymer so as to improve hardness, adhesiveness, and other physical properties.

It is another object of this invention to provide compositions which are suitable for use as coating resins for application to glass, metal, e.g., aluminum, copper, steel, etc., either in the form of wire or panels, and to natural and synthetic fibers.

It is another object of this invention to improve the chemical resistance and impact strength of the epoxide resins.

Various other objects and advantages will become apparent to those skilled in the art upon reading the accompanying description and disclosure.

In general, the above objects are accomplished by blending copolymers of the perfluorochloroolefins such as trifluorochloroethylene copolymerized with halogenated olefins, preferably fluoroethylenes, such as vinylidene fluoride with an epoxide resin.

The perfluorochloroolefin copolymers to which this invention is applicable, are the normally solid copolymers which have softening points above about 150° C. This group contemplates trifluorochloroethylene copolymerized with halogenated olefins, such as vinyl chloride, vinylidene chloride, vinyl fluoride, vinylidene fluoride, 1,1-fluorochloroethylene, and trifluoroethylene. The invention is particularly concerned with copolymers of trifluorochloroethylene and vinylidene fluoride which contain between about 20 and not higher than 80 mole percent of trifluorochloroethylene. As indicated previously, depending upon the mole concentration of trifluorochloroethylene, the properties of the copolymer range between relatively hard resins to rather soft elastomeric materials. Thus, if between about 20 and about 69 mole percent of trifluorochloroethylene is present, the copolymer has the properties characteristic of an elastomer, whereas if above 69 and not higher than 80 mole percent of trifluorochloroethylene is present, the copolymer has the characteristics of a resin. Within the ranges specified the preferred mole concentration of trifluorochloroethylene copolymerized with vinylidene fluoride is between about 25 and about 50 mole percent for the elastomer and between about 70 and about 75 mole percent for the resin.

Since the process of this invention relates to new and novel compositions, their preparation and use, unnecessarily detailed description of the methods of preparation of the copolymer is not warranted. Therefore, only methods of preparation of typical resinous and elastomeric copolymers are given although by employing substantially identical polymerization systems but with different monomer feed ratios and polymerization times any copolymer in the range contemplated by this invention may be prepared.

A typical resinous copolymer may be prepared by the procedure given below using the following water-suspension type recipe.

| | Parts by weight |
|---|---|
| Water, distilled | 200 |
| $CF_2=CFCl$ | 92.2 |
| $CF_2=CH_2$ | 7.8 |
| $(NH_4)_2S_2O_8$ | 2.0 |
| $Na_2S_2O_5$ | 0.8 |
| $FeSO_4 \cdot 7H_2O$ | 0.2 |

Catalyst and activator solution was prepared by dissolving 2 parts of $(NH_4)_2S_2O_8$ in 20 parts of water. Next, 0.8 part of $Na_2S_2O_5$ was dissolved in another 20 parts of water. In still another 20 parts of water, 0.2 part of $FeSO_4 \cdot 7H_2O$ was dissolved. 140 parts of water were next charged to a silver-lined steel bomb. The aforementioned $(NH_4)_2S_2O_8$, $Na_2S_2O_5$, and the $FeSO_4 \cdot 7H_2O$ solutions were then added in succession. The contents of the bomb were frozen after each addition. The bomb was then closed and evacuated. Thereafter, 92.2 parts of $CF_2=CFCl$ and 7.8 parts of $CF_2=CH_2$ were flash-distilled into it. The bomb was then rocked at 20° C. over a period of 18 hours. The residual monomer was then vented from the bomb and a mixture of water and particles of resinous polymer were discharged. These particles were washed with hot water to remove residual salts, and were then dried in vacuo at room temperature. The mole percent of $CF_2=CFCl$, combined in the resulting copolymeric product was 75 percent.

A typical elastomeric copolymer may be prepared using the following water-suspension type recipe.

| | Parts by weight |
|---|---|
| Water, distilled | 200 |
| $CF_2=CFCl$ | 64.5 |
| $CF_2=CH_2$ | 35.5 |
| $K_2S_2O_8$ | 1.0 |
| $Na_2S_2O_5$ | 0.4 |
| $FeSO_4 \cdot 7H_2O$ | 0.1 |

Catalyst and activator solution was prepared by dissolving 1 part of $K_2S_2O_8$ in 20 parts of water. In still another 20 parts of water, 0.1 part of $FeSO_4 \cdot 7H_2O$ was dissolved. 140 parts of water were next charged to a silver-lined steel bomb. The aforementioned $K_2S_2O_8$, $Na_2S_2O_5$, and the $FeSO_4 \cdot 7H_2O$ solutions were then added in succession. The contents of the bomb were frozen after each addition. The bomb was then closed and evacuated. Thereafter, 64.5 parts of $CF_2=CFCl$ and 35.5 parts of $CF_2=CH_2$ were flash-distilled into it. The bomb was then rocked at room temperature (between about 25° C. and about 35° C.) for a period of 24 hours. The residual monomer was then vented from the bomb and a mixture of water and chunks of rubbery polymer were discharged. Thus, chunks were washed with hot water to remove residual salts and were then dried in vacuo at room temperature. The mole percent of $CF=CFCl$ combined in the resulting copolymeric product was 49 percent.

The epoxide resins which are used in the composition of this invention, are prepared by the condensation of epoxy compounds, such as epichlorohydrin and glycerol dichlorohydrin with polyhydric organic compounds in the presence of sodium hydroxide to split off HCl or NaCl. Among the polyhydric compounds which can be used are alcohols, such as mannitol, sorbitol, erythritol, pentaerythritol and polyallyl alcohol; dihydric alcohols, such as glycerol or trimethyl propane; dihydric phenols, such as bisphenol (p,p'-dihydroxy diphenyl dimethyl methane) and trihydric phenols. Because of their greater bond strength, higher chemical resistance, better physical properties and availability, epoxide resins prepared by the condensation of bisphenol and epichlorohydrin are preferred in the preparation of the compositions of this invention. In their original form, the epoxide resins are relatively low molecular weight compounds ranging from liquids to rather high melting solids depending on the degree of condensation. Thus, the epoxide resins range in properties from light mobile liquids melting at about 0° C. and having a viscosity from C to F on the Gardner-Holdt scale, up to high melting solids having a melting point of about 160–170° C. and a viscosity, as a 40 percent solution in butyl carbitol, of about $Z_1-Z_5$ on the Gardner-Holdt scale. The degree of condensation of the epoxy resins can be defined by reference to the "epoxy value" which is defined as the equivalent of epoxy groups per 100 gms. of resin. The resins used in this invention have an epoxy value between about 0.03 and about 0.65. The epoxy value of normally liquid resins ranges between about 0.3 and about 0.65 while normally solid resins range between about 0.03 and about 0.3. Another and more frequently used expression for indicating the degree of condensation of the resin is the "epoxy equivalent" which is defined as the weight of resin in gms. containing one gm. equivalent of epoxy groups. Here, the higher the equivalent the higher the degree of condensation of resin. Under this definition the resins of this invention should have an epoxy equivalent of at least 150 and should preferably not exceed about 3400. The epoxide resins are commercially available as Epon, Araldite, etc.

As indicated previously, the epoxide resins are available as liquids or solids. In preparing the compositions of this invention, employing cross-linking or curing agents as described below, either liquid or solid epoxy resins can be employed, since on curing, very little difference is observed between compositions which are based on the liquid or the solid resins. However, because the compositions are usually heated at relatively high temperatures, the use of relatively high boiling, i.e., normally solid, epoxide resins is preferred. When cross-linking or curing agents are not employed, the normally solid epoxide resins are preferred, since better physical characteristics are obtained. When the solid epoxide resins are employed, it is preferred that they be used in the form of solutions in suitable volatile solvents, such as ketones, e.g., methyl ethyl ketone, methyl isobutyl ketone, etc.; esters, e.g., butyl carbitol, etc.; cyclic ethers, such as tetrahydrofuran, etc. The perfluorochloroolefin copolymer is also soluble in these solvents and should be soluble in any other solvent which is to be used. The liquid epoxide resins are of particular value in preparing solvent-free paste compositions, cements, etc. for application by brush and dip techniques although they can also be used as solutions in the above described solvents.

In preparing the compositions of this invention, between about 1 and about 99 weight percent, preferably between about 10 and about 90 weight percent of the perfluorochloroolefin copolymer is mixed and blended with the epoxide resin. The exact proportion of copolymer is based on the properties which are desired in the resulting composition, e.g., softness, bond strength, chemical resistance, flexibility, thermal stability, etc. Thus, where maximum chemical resistance, flexibility, softness and high impact strength is desired, the concentration of perfluorochloroolefin copolymer constitutes a major proportion of the composition, that is above about 50 weight percent, whereas when hardness and maximum bond strength is required, the perfluorochloroolefin copolymer constitutes a minor proportion, that is below about 50 weight percent of the composition. In some applications it will be desired to build up in successive layers an ultimate article having a major proportion of one constituent at one surface and a major proportion of another constituent at the opposite surface. For example, in coating of metal, such as metal tanks, and in the application of wire coatings, maximum bond strength is desired at the metal interface, whereas chemical resistance is desired at the outer surface. This can be achieved by the application of coatings which contain a minor proportion of the copolymer at the metal interface and then coating this coating with a composition which contains a major proportion of the copolymer.

Both the perfluorochloroolefin copolymer and the epoxide resin can be cross-linked thereby decreasing solubility, increasing chemical resistance and converting the resins from chain to space polymers, by the addition of suitable cross-linking or curing agents. For example, copolymers of trifluorochloroethylene and vinylidene fluoride are cross-linked by the addition of organic peroxides, such as benzoyl peroxide, lauryl peroxide, etc.; inorganic peroxides, such as lead, barium and zinc peroxide and basic oxides, such as magnesium oxide, zinc oxide and lead oxide; inorganic polysulfides, such as the alkali metal polysulfides and ammonium polysulfides. The above enumerated cross-linking agents are specific to the perfluorochloroolefin copolymer. The epoxide resins are cross-linked by the addition of dialdehydes, for example glyoxal and dimercaptans which are specific to the epoxide resins. While the cross-linking of the individual components of the blend to themselves, i.e., epoxide to epoxide and copolymer to copolymer, can be effected by the use of the specific cross-linking agents, such use is not preferred since the components tend to become incompatible and since the chemical and physical characteristics of the composition are not as good. On the other hand, cross-linking of the epoxide resin to the perfluorochloroolefin copolymer can be effected by incorporation of compounds, such as di-isocyanates, e.g., methylene bis-(4-phenyl)-isocyanate, and amines and polyamines. In connection with the cross-linking of the epoxide resin to the copolymer, the polyamine curing agents are preferred, since they are more reactive. Additionally, the use of polyamine cross-linking agents is preferred to the use of the specific agents enumerated above, since the ultimate composition resulting from their use has superior chemical and physical properties. For cross-linking, using any of the above described curing agents, the concentration is maintained between about 1 and about 12 weight percent based on the weight of the material for which the curing agent is specific and preferably between about 4 and about 8 percent. In the case of polyamine curing agents, the concentration of curing agent is maintained between about 1 and about 12 weight percent of the blend and preferably between about 4 and about 8 weight percent. Representative of the preferred polyamine cross-linking agents, are diethylaminopropylamine, ethylene diamine, diethylene triamine, triethylene tetramine, tetraethylene pentamine, hexamethylene diamine, piperazine, 1,5-naphthalene diamine, diaminoanisole, diaminobenzoic acid, diamino stilbene, diamino triphenol methane, triaminotriphenyl methane, diamino phenol, diamino benzene, triamino benzene, triamino benzoic acid, triamino phenol, 1,2-propylenediamine, 1,2,3-triamino propane, etc. Where a compound has several isomeric forms, all isomers are intended. From the above, it can be seen that polyamines having the general formula

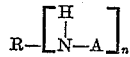

in which R is a polyfunctional organic radical, A is a member of the group consisting of hydrogen and monofunctional organic radicals and $n$ is an integar of at least 2, can be used. The cross-linking reaction employing either the specific cross-linking agents or the polyamine curing agents, is effected by heating the composition at a temperature above about 50° C. and below the decomposition temperature of the material, and preferably between about 100° C. and about 200° C. for a period of time sufficient to effect the cure which is usually between about 1 minute and 6 hours. In connection with the cross-linking of the copolymer to the epoxide resin, it is believed that a hydrogen on one amine group reacts with halogen, usually chlorine in the copolymers to split off HCl while a hydrogen on another amine group splits the epoxy linkage to form a hydroxyl group and a carbon bonded to nitrogen. This theory is offered for a better understanding of the invention and not in limitation. In addition to cross-linking the epoxide resin to the copolymer, the polyamine will also cross-link epoxide to epoxide and copolymer to copolymer. Hence, the cured blend will contain a number of reaction products.

In order to illustrate the process of this invention the following examples which are offered for purposes of illustration and not necessarily for limitation, are presented. Parts are by weight.

In the examples, coatings are applied by spray technique, hence viscosity is important. For this reason, a 20 weight percent solids concentration is employed. In instances where higher viscosities can be tolerated, higher solids concentration can be employed, for example up to 30 weight percent for brush and dip application techniques and up to 50 weight percent when the compositions are used as caulking compounds. The compositions can be used without solvents as indicated previously, although such use usually requires high temperatures, e.g., between about 100° C. and 200° C. to soften the resin. Such temperatures also serve to cure the blend when cross-linking agents are employed.

Example I

A mixture of approximately 72 weight percent of a copolymer of trifluorochloroethylene and vinylidene fluoride (72/28 mole ratio), approximately 22 weight percent of Epon 1009 which is a condensation product of epichlorohydrin and bisphenol having a melting point of approximately 145–155° C. and an epoxy value of 0.03 and 6 weight percent of diethylene triamine curing agent is prepared. Approximately 20 weight percent of this admixture is dissolved in 80 weight percent of a solvent mixture of 30 parts of methyl ethyl ketone, 30 parts of methyl isobutyl ketone and 20 parts of toluene. This solution is then sprayed on to steel panels after which the solvent is evaporated by heating at a temperature of about 55° C. The coated panel is then heated at about 150° C. for about 6 hours to cure the resin blend. A firmly bonded, insoluble, homogeneous, chemically resistant flexible coating is obtained.

Example II

A mixture of approximately 22 weight percent of a copolymer of trifluorochloroethylene and vinylidene fluoride (72/28 mole ratio), 72 weight percent of Epon 1009 and 6 weight percent of diethylene triamine is prepared. This mixture is dissolved in approximately 80 weight percent of a solvent mixture of methyl ethyl ketone, methyl isobutyl ketone and toluene (30/30/20). The solution is then applied by spray technique to steel panels after which the solvent is evaporated and the coated panel heated at 150° C. for about 6 hours. A solvent insoluble protective coating having good chemical properties is obtained.

Example III

A mixture of approximately 72 weight percent of a copolymer of trifluorochloroethylene and vinylidene fluoride (50/50 mole ratio), approximately 22 weight percent of Epon 1009 and 6 weight percent of diethylene triamine curing agent is prepared. Approximately 20 weight percent of this admixture is dissolved in 80 weight percent of a solvent mixture of methyl ethyl ketone, methyl isobutyl ketone and toluene (30/30/20). This solution is then sprayed on to steel panels after which the solvent is evaporated by heating at a temperature of about 55° C. The coated panel is then heated at about 150° C. for about 6 hours to cross-link the resin blend. A firmly bonded insoluble chemically resistant coating is obtained.

Example IV

A mixture of approximately 22 weight percent of a copolymer of trifluorochloroethylene and vinylidene fluoride (50/50 mole ratio), 72 weight percent of Epon 1009 and 6 weight percent of diethylene triamine is prepared. This mixture is dissolved in approximately 80 weight percent of a solvent mixture of methyl ethyl ketone, methyl isobutyl ketone and toluene (30/30/20). The solution is then applied by spray technique to steel panels after which the solvent is evaporated and the coated panel heated at about 150° C. for about 6 hours. A solvent insoluble protective coating having good chemical properties is obtained.

In order to demonstrate the bond strength of the compositions of this invention, the accelerated test of Example V was run. In this test, the cross-linking agent was omitted.

Example V

A mixture of approximately 25 weight percent of Epon 1009 and 75 weight percent of a copolymer of trifluorochloroethylene and vinylidene fluoride (72/28 mole ratio) was prepared. Approximately 20 weight percent of this mixture was dissolved in 80 weight percent of a mixture of methyl ethyl ketone, methyl isobutyl ketone, and toluene (30/30/20). This solution was applied by spraying to grit blasted steel panels. A three mill coating on the steel panel was built up by the application of three coats with air-drying between each coating. The final coat was air-dried, after which it was baked at a temperature starting at 55° C. and progressing up to 150° C. where it was maintained for 6½ hours. The coating was scratched through to the steel surface and was then subjected to high pressure steam for successive periods of ½, 1, and 1½ hours. After each exposure the adhesion to steel was checked. The coating was firmly bonded to the steel panel and did not evidence creep corrosion in the areas adjacent to the scratches.

From the above it can be seen that the blended resins of this invention are adaptable as coating compositions due to their combination of hardness, flexibility, thermal stability, chemical resistance and good coating characteristics. Additionally, these blends can be used without curing agents although, the use of cross-linking agents is preferred because of the superior properties of the compositions as pointed out above. These resin compositions are also useful as filleting and caulking compounds where their chemically resistant properties makes their use advantageous. Moreover, apart from their use as coatings, blends can be molded into various useful items, such as plugs, mounting boards, etc. by standard molding techniques. Fillers, pigments, stabilizers, etc., can be added to the resin to modify its properties.

Various modifications and alternations of the process of this invention will be apparent to those skilled in the art and may be used without departing from the scope of this invention.

Having thus described my invention, I claim:

1. A novel composition comprising an admixture of (1) between about 1 and about 98 weight percent of a copolymer containing between above 20 and not higher than 80 mole percent of trifluorochloroethylene copolymerized with vinylidene fluoride, (2) between about 1 and about 98 weight percent of the condensation product of epichlorohydrin and p,p'-dihydroxy diphenyl dimethyl methane, said condensation product having a melting point of at least 0° C. and an epoxy equivalent of at least 150 and not exceeding about 3400 and (3) between about 1 and about 12 weight percent of a polyamine cross-linking agent selected from the group consisting of primary and secondary polyamines, said weights being based on the total weight of (1), (2) and (3).

2. The composition of claim 1 in which the polyamine cross-linking agent is diethylene triamine.

3. The composition of claim 1 in which the polyamine cross-linking agent is ethylene diamine.

4. The composition of claim 1 in which the polyamine cross-linking agent is diethyl amino propylamine.

5. The composition of claim 1 in which the polyamine cross-linking agent is dicyandiamide.

6. The composition of claim 1 in which the polyamine cross-linking agent is diaminobenzene.

7. A novel composition comprising an admixture of (1) between about 1 and about 98 weight percent of a copolymer containing between 20 and about 69 mole percent of trifluorochloroethylene copolymerized with vinylidene fluoride, (2) between about 1 and about 98 weight percent of the condensation product of epichlorohydrin and p,p'-dihydroxy diphenyl dimethyl methane, said condensation product having a melting point of at least 0° C. and an epoxy equivalent of at least 150 and not exceeding about 3400 and (3) between about 1 and about 12 weight percent of a polyamine curing agent selected from the group consisting of primary and secondary polyamines, said weights being based on the total weight of (1), (2), and (3).

8. A novel composition comprising an admixture of (1) between about 1 and about 98 weight percent of a copolymer containing above 69 and not higher than 80 mole percent of trifluorochloroethylene copolymerized with vinylidene fluoride, (2) between about 1 and about 98 weight percent of the condensation product of epichlorohydrin and p,p'-dihydroxy diphenyl dimethyl methane, said condensation product having a melting point of at least 0° C. and an epoxy equivalent of at least 150 and not exceeding about 3400 and (3) between about 1 and about 12 weight percent of a polyamine curing agent selected from the group consisting of primary and secondary polyamines, said weights being based on the total weight of (1), (2) and (3).

9. A resinous mass comprising a copolymer containing between about 20 and not higher than 80 mole percent of trifluorochloroethylene copolymerized with vinylidene fluoride cross-linked by polyamine linkages said polyamine selected from a member of the class consisting of primary and secondary polyamines to a condensation product of epichlorohydrin and p,p'-dihydroxy diphenyl dimethyl methane having a melting point of at least 0° C. and an epoxy equivalent of at least 150 and not exceeding about 3400.

10. A resinous mass comprising a copolymer containing between about 20 and about 69 mole percent of trifluorochloroethylene copolymerized with vinylidene fluoride cross-linked by polyamine linkages said polyamine selected from a member of the class consisting of primary and secondary polyamines to a condensation product of epichlorohydrin and p,p'-dihydroxy diphenyl dimethyl methane having a melting point of at least 0° C. and an epoxy equivalent of at least 150 and not exceeding about 3400.

11. A resinous homogeneous mass comprising a copolymer containing above 69 and not higher than 80 mole percent of trifluorochloroethylene copolymerized with vinylidene fluoride cross-linked by polyamine linkages said polyamine selected from a member of the class consisting of primary and secondary polyamines to a condensation product of epichlorohydrin and p,p'-dihydroxy diphenyl dimethyl methane having a melting point of at least 0° C. and an epoxy equivalent of at least 150 and not exceeding about 3400.

12. A method for cross-linking a copolymer containing between about 20 and not higher than 80 mole percent of trifluorochloroethylene copolymerized with vinylidene fluoride to a condensation product of epichlorohydrin and p,p'-dihydroxy diphenyl dimethyl methane having a melting point of at least 0° C. and an epoxy equivalent of at least 150 and not exceeding about 3400 which comprises reacting said copolymer with said condensation product at a temperature above about 50° C. in the presence of a polyamine cross-linking agent selected from the group consisting of primary and secondary polyamines.

References Cited in the file of this patent

UNITED STATES PATENTS

| | | |
|---|---|---|
| 1,837,555 | Kratz | Dec. 22, 1931 |
| 2,451,174 | Reuter | Oct. 12, 1948 |
| 2,468,054 | Ford | Apr. 26, 1949 |
| 2,777,783 | Welch | Jan. 15, 1957 |